May 8, 1956     E. LAMMERZ     2,744,421
POWER TRANSMISSION FOR VEHICLES, PARTICULARLY RAIL
VEHICLES WITH INDIVIDUAL AXLE DRIVE
Filed July 10, 1950

*Inventor:*
ERNST LAMMERZ
By Toulmin & Toulmin
ATTORNEYS

United States Patent Office 2,744,421
Patented May 8, 1956

2,744,421

POWER TRANSMISSION FOR VEHICLES, PARTICULARLY RAIL VEHICLES WITH INDIVIDUAL AXLE DRIVE

Ernst Lammerz, Essen, Germany, assignor to Fried. Krupp Lokomotivfabrik, Essen, Germany Application July 10, 1950, Serial No. 172,907

Claims priority, application Germany July 30, 1949

4 Claims. (Cl. 74—665)

The invention pertains to a motor vehicle, especially a rail engine car with individual axle drive from a power dividing or differential gear, which drives a number of axles individually or in multiple, and in which, in case of a transmission of the total power through a single axle, another axle takes up the total power upon a change of the direction of travel. In a known motor vechicle of this kind a converter is provided for each velocity stage, while, with another known motor vehicle, three stages of velocity are attained with the use of one converter, the intermediary guide-wheel, of which works as counterrotation or birotary turbine, and which is, therefore, a converter whose form of construction deviates from the usual ones toward greater complexity.

The present invention eliminates the disadvantages of these known motor vehicles, in that a common, single hydraulic flow transmission or gearing is provided, which is equipped with a guiding apparatus permanently stationary in all working instances for all stages of velocity, which is put in series with or superimposed to the power dividing gear. Thereby results the advantage, that upon the use of only one turbo circuit developed as usual hydraulic turbo-converter with stationary guiding apparatus, three velocity stages may be attained with the employment of only one differential gear. Therefore, by means of a power transmission with only a few gears, a wide range of speeds can be attained.

These and other objects and advantages of the invention will appear more clearly from the following specification in connection with the accompanying drawings, in which:

Figure 1 diagrammatically illustrates a top view of a first embodiment of the invention.

Figure 3:
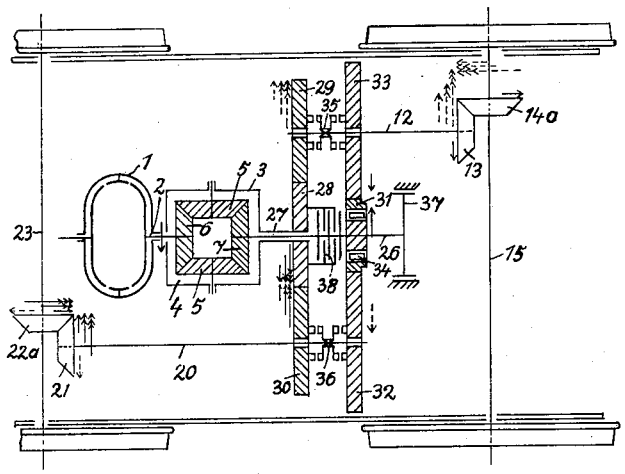
Figure 3 represents a further embodiment of the invention.
Figure 4:
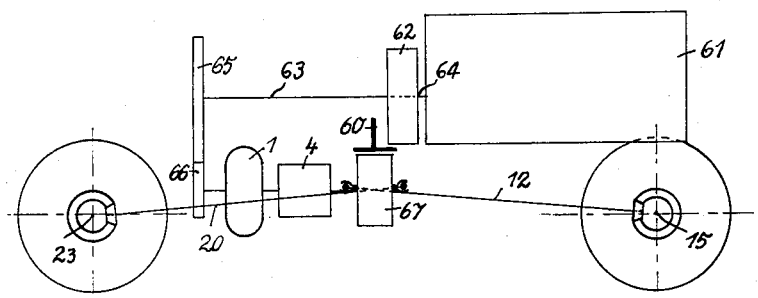

Figure 4 diagrammatically illustrates a practical installment of the arrangement of Figure 3 in a vehicle.

GENERAL ARRANGEMENT

As mentioned above, with vehicles such as rail vehicles having at least two axles adapted to be driven individually, one and the same axle is receiving driving power at all speeds and, thus, wears off faster than the other axle which receives driving power only in the first and second speeds. With such a motor vehicle, where in case of the transmission of the total power through one single axle, another axle receives the power upon change of the direction of travel, a wide range of speeds can be obtained with few gears, and the application of conventional hydraulic flow transmission with a permanently stationary guiding apparatus. According to the present invention, a common, single hydraulic flow or circuit transmission for all velocity stages, equipped with a guiding apparatus permanently stationary in all operative or working instances, is connected in series to the power dividing or differential gearing. In further development of the invention, the means effecting the change in traveling direction by shifting the power from one axle to another is common to the drive train to the axles. An especially effective form of construction is obtained when the change in direction of travel is effected through release of a driving section of the train belonging to one axle and the bringing thereof into engagement with the train belonging to the other axle.

STRUCTURAL ARRANGEMENT

In order to facilitate the understanding of the present invention, the direction of rotation has been indicated in the drawings by arrows, with the arrows shown in full line indicating the direction of rotation during the forward drive, whereas the arrows shown in dotted lines indicate the direction of rotation during the rearward drive. The drawing, furthermore, indicates in full lines the position the transmission members occupy during the forward drive, while the same members, when shown in dotted lines, indicate their position during the rearward drive.

Furthermore, the number of the respective speed is indicated by a corresponding number of arrow-heads. Thus, an arrow with one arrow-head represents the first speed, while arrows with two and three arrow-heads respectively indicate the second and third speed. The relative number of revolutions per minute of the gears is indicated by a corresponding size of the arrows.

Figure 1:
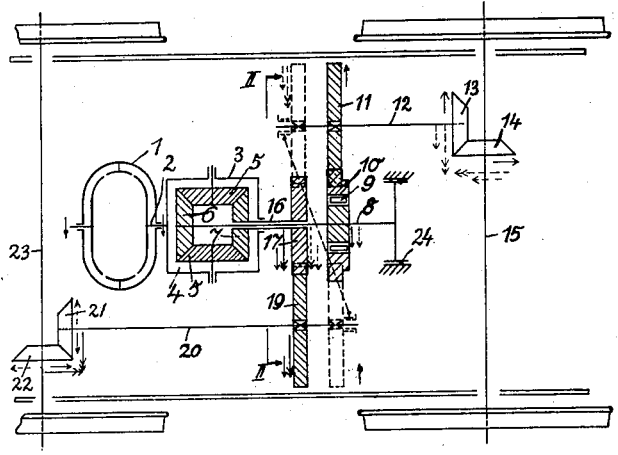
Figure 2:
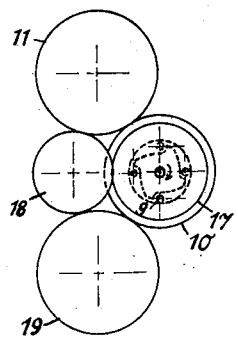
Figure 2 is a view taken aong the line II—II of Figure 1.

Referring now to the drawings in detail and Figures 1 and 2 thereof in particular, the structure shown therein illustrates an arrangement comprising a fluid drive 1, the input shaft of which is driven by a non-reversible prime mover, for instance, an internal combustion engine or a steam turbine (not shown in the drawing). The output shaft 2 of the fluid drive 1 is positively connected to a transmission gear box 3 of a differential transmission 4, representing a planetary bevel gear transmission. The gear box 3 carries loosely rotatable therein the planetary wheels 5 which continuously mesh with two bevel wheels 6 and 7. Supported by the shaft 8 of bevel wheel 6 through a free wheel drive 9, is a gear 10 meshing with a gear 11 of identical size.

The gear 11 is non-rotatably, but slidably supported by the drive shaft 12 which is positively drivingly connected through a pair of bevel gears 13, 14 with the axle 15, which latter represents the front axle when the vehicle drives in forward direction. A gear 17 is connected to the hollow shaft 16 which is connected to the second bevel wheel 7 and surrounds the shaft 8. The gear 17 meshes with a reversing gear 18 (Figure 2), which latter is adapted to be engaged by a gear 19. The gear 19 has the same size as the gear 11 and, similar to the latter, is non-rotatably, but slidably mounted on the drive shaft 20 which is positively drivingly connected through bevel gears 21, 22 with the axle 23, which latter represents the rear axle when the vehicle drives in forward direction.

In order to effect rearward drive, the gears 11 and 19 are shifted in opposite directions so that the gear 11 meshes with the reversing gear 18 and, thus, is in positive driving connection with the gear 17, while the gear 19 directly engages the gear 10. In order to prevent a simultaneous engagement of the reversing gear 18 and the gear 17 by the gear 11, the gear 17 has a somewhat smaller diameter than the gear 10. The free end of the inner shaft 8, furthermore, carries a brake member 24 adapted to be engaged in order to hold the bevel wheel 6 stationary.

The arrangement according to Figure 1 yields two speeds for the forward drive and two speeds for the rearward drive. At the first speed (A), the two axles 15 and 23 are driven individually of each other (individual axle drive). At the second speed (B), only one axle, namely, the axle following another axle in traveling direction, is driven, but at double the speed. In other words, at the second speed when driving forwardly, the axle 23 is the driving axle, whereas when driving rearwardly, the axle 15 is the driving axle. At the first speed during the starting operation, the two simultaneously driven axles 15 and 23 together exert double the pulling forces as produced at the second speed. Furthermore, with regard to the various speeds, the following may be noted.

A. FIRST SPEED a. Forward drive

Brake 24 is released. Thus, the bevel wheel shafts 8 and 16 rotate at the same speed as the gear box 3 and output shaft 2 of the fluid drive 1 and, also, in the same direction. Consequently, the power is conveyed from the output shaft 2 through the elements 9 to 14 to the axle 15 and through the elements 17 to 22 to the axle 23.

b. Rearward drive

The wheels 11 and 19 are shifted in opposite directions into the position indicated in Figure 1 by dotted lines. The shafts 8 and 16 will then convey their driving power to the axles 23 and 15 respectively. More specifically, the shaft 8 conveys its driving power through elements 9, 10 and 19 to 22 to the axle 23, whereas the hollow shaft 16 conveys its driving power through the elements 17, 18 and 11 to 14 to the axle 15.

B. SECOND SPEED a. Forward drive

The gears 11 and 19 are again moved to their position indicated in full lines. The brake 24 is engaged so that the shaft 8, with the bevel wheel 6, is held stationary. Consequently, the bevel wheel 7 rotates at twice the speed of the gear box 3, which latter has the same speed of rotation as the turbine shaft 2 of the fluid drive 1. Consequently, the hollow shaft 16 drives the axle 23 at twice the speed it had at the first speed, while the axle 15 is idling. During this operation, the gear 10 is taken along and overtakes the free wheel drive 9, so that it rotates loosely over the latter.

b. Rearward drive

The gears 11 and 19 are moved into the position shown in dotted lines. When the brake 24 is engaged and the shaft 8 thereby becomes stationary, the hollow shaft 16 drives the axle 15 through gear 11, and the idling axle 23 rotates the gears 19 and 10. The gear 10 overtakes the free wheel drive 9, so that it rotates loosely over the latter.

Referring now to the second embodiment shown in Figure 3, the differential transmission 4 is again preceded by a fluid drive 1. However, in contrast to the arrangement shown in Figures 1 and 2, the bevel wheel 6 is driven by the output shaft 2 of the fluid drive 1. The other bevel wheel 7 is rigidly connected to an inner shaft 26. The gear box 3, carrying the planetary wheels 5, has rigidly connected thereto a hollow shaft 27 surrounding the shaft 26. Rigidly connected to the hollow shaft 27 is a gear 28, which continuously meshes with two identical gears 29 and 30, arranged at two substantially opposite sides of the gear 28. The gears 29 and 30 are freely rotatably mounted on the drive shafts 12 and 20 respectively. The shaft 26, through a free wheel drive 34, carries a gear 31, which continuously meshes with two gears 32 and 33, arranged at different sides of the gear 31. The gears 32 and 33 are likewise freely rotatably mounted on the drive shafts 20 and 12 respectively.

While the gear 28 has the same diameter as the freely rotatable gears 29 and 30, the gear 31 has only half the diameter of the freely rotatable gears 32 and 33. Therefore, the gears 29 and 30 convey the rotation of the hollow shaft 27 at the transmission ratio 1:1, whereas the freely rotatable gears 32 and 33 convey the rotation of the shaft 26 at the transmission ratio 1:2. In other words, the gears 32 and 33 act as reduction gears. Arranged between the freely rotatable gears 29 and 33 is a clutch sleeve 35, provided with jaws, which is slidably mounted on the shaft 12, but is keyed to the shaft 12 so as to rotate in unison therewith. The jaws of the clutch sleeve 35 are adapted selectively to engage corresponding jaws associated with the gears 29 and 33 respectively so as to selectively effect driving connection between the gear 29 and the shaft 12, or the gear 33 and the shaft 12. Similarly, there is arranged between the freely rotatable gears 30 and 32, a clutch sleeve 36, provided with clutch jaws adapted selectively to engage clutch jaws respectively associated with the gears 30 and 32. The free end of the shaft 26 is, furthermore, provided with a brake member 37, adapted to be engaged in order to hold the bevel wheel 7 stationary. Provided between the gears 28 and 31 is a multiple disc clutch 38 adapted to effect driving connection between the shafts 26 and 27. The drive shafts 12 and 20 are again drivingly connected with the axles 15 and 20 through bevel gears 13, 14a, and 21, 22a respectively.

However, as will be clear from a comparison of Figure 3 with Figure 1, the bevel gears 14a and 22a are arranged on the opposite side with regard to the gears 14 and 22 of Figure 1.

The transmission according to Figure 3, provides for three speeds (C, D, and E) in each traveling direction. At the first speed (C) providing the greatest pulling forces, the two axles 15 and 23 rotate with one-fourth of the number of revolutions ($n/4$) performed by the output shaft 2 of the fluid drive 1. At the second and third speeds (D and E), only one axle is driven, namely, that axle which follows the other axle in traveling direction. At the second speed (D), the driven axle rotates with half the number of revolutions ($n/2$) of the output shaft 2, whereas at the third speed (E), the driven axle performs the same number of revolutions ($n$) as the output shaft 2. More specifically, the conditions are as follows:

C. FIRST SPEED a. Forward drive

The two axles 15 and 23 are driven. The brake 37 and the clutch 38 are released so that the gear box 3, as well as the bevel wheel 7, are adapted to convey their power through shafts 27 and 26 independently of each other. Due to the different transmission ratios described above gear 31 and therefore shaft 26 and bevel wheel 7 rotate in opposite direction and with twice the speed of gear 28 and therefore hollow shaft 27 and gear box 3, when both axles 15 and 23 are independently driven. According to the known laws of planetary bevel gear transmissions, whereby the gear box 3 rotates with a speed corresponding to the mean value of the rotation speeds of the bevel wheels 6, 7, the gear box 3 will drive the hollow shaft 27 and gear 28 connected thereto with one-fourth $n/4$ the number of revolutions performed by the bevel wheel 6 and the output shaft 2 of the fluid drive 1, while the bevel wheel 7 and the shaft 26, with the gear 31 connected thereto, are driven with one-half $n/2$ of the number of revolutions of the output shaft 2, but in the opposite direction with regard to the gear box 3 and the bevel wheel 6. Inasmuch as the freely rotatable gears 32 and 33, due to the transmission ratio of 1:2, further reduce the number of revolutions of the gear 31 by one-half, the freely rotatable gears 32, 33, as well as the freely rotatable gears 29, 30 rotate with one-fourth the number of the revolutions performed by the output shaft 2. In order to effect the forward drive, the clutch sleeve 35 is moved toward the right and the clutch sleeve 36 is moved toward the left, with regard to Figure 3. In this way, the large freely rotatable wheel 33 is drivingly connected with the drive shaft 12, while the small freely rotatable gear 30 is positively drivingly connected with the drive shaft 20.

b. Rearward drive

By shifting the clutch sleeve 35 toward the left and the clutch sleeve 36 toward the right with regard to Figure 3, the connections for the rearward drive are effected. In this instance, the small freely rotatable gear 29 is positively drivingly connected with the drive shaft 12, while the large freely rotatable gear 32 is positively drivingly connected with the drive shaft 20.

D. SECOND SPEED a. Forward drive

Only one axle, namely, the axle 23, following the front axle 15 is driven. The front axle 15 idles. The brake 37 is engaged so that the bevel wheel 7 is held stationary. With the speed (n) of the output shaft 2 remaining the same, the gear box 3 is driven in the same direction with half the number of revolutions n/2 of the output shaft 2. Therefore, through the clutch sleeve 36, occupying its left hand position with regard to Figure 3, the drive shaft 20 and the rear axle 23 are likewise driven with half the number of revolutions of the output shaft 2. The coupling sleeve 35, occupying the right-hand position with regard to Figure 3, and the gear 33 are taken along by the front axle 15 through the drive shaft 12. The gear 31, meshing with the gear 33, is rotated idling over the free wheel drive 34.

b. Rearward drive

The coupling sleeve 35 is shifted toward the left with regard to Figure 3 and drives through drive shaft 12, the axle 15 at half the number of revolutions n/2 of the output shaft 2. It will be noted that, at the rearward drive, the now driven axle 15 again follows an idling axle in the direction of travel. The coupling sleeve 36 is moved toward the right with regard to Figure 3 and conveys the rotation of the idling axle 23 through drive shaft 20 to the freely rotatable gear 32. The gear 31 continuously meshing with the gear 32 rotates freely, with regard to the shaft 26, due to the free wheel drive 34.

E. THIRD SPEED a. Forward drive

Similar to the second speed, only one axle is driven. The brake 37 is released. The clutch 38 is engaged so that the gear box 3 and the bevel wheel 7 are connected for rotation in unison with each other. The differential transmission then merely acts like a fly wheel. The shaft 26, as well as the hollow shaft 27, rotates with the same number of revolutions (n) as the output shaft 2 of the fluid drive 1. By shifting the clutch sleeve 36 toward the left and the clutch sleeve 35 toward the right, the driving power is, similar to the conditions prevailing at the second speed, conveyed from the gear 28 to the rear axle 23, whereas the front axle 15 idles.

b. Rearward drive

By shifting the clutch sleeve 35 toward the left and the clutch sleeve 36 toward the right, the driving power is conveyed from the gear 28 to the axle 15, which now follows the axle 23 in traveling direction, whereas the axle 23 is running idle and the gear 31 rotates freely with regard to the shaft 26 due to the free wheel drive 34.

Referring now to Figure 4, this figure shows a further development of the arrangement of Figure 3 and illustrates a particularly advantageous arrangement and installment of the various parts. This arrangement is particularly well adapted for application to trucks for railway vehicles. At one side of the intermediate transverse beam 60, the motor 61 with the free wheel 62 is arranged. At the other side in the space between the step-up transmission stage 65, 66, driven by an extension 63 of the motor shaft 64 and the intermediate transverse beam 60, the fluid drive 1 and the differential transmission 4 may be arranged. Below the beam 60, the casing 67 for the freely rotatable gears 29, 30, 32 and 33 may be provided. The shafts carrying the freely rotatable gears are preferably constructed as hollow shafts so that the drive shafts 12, 20 may be passed therethrough and, consequently, may be made relatively long.

The invention is particularly adapted for diesel locomotives and rail vehicle trucks of such vehicles which must be able to drive equally well in either direction.

It is, of course, understood that the present invention is by no means limited to the particular construction shown in the drawings but, also, comprises any modifications within the scope of the appended claims. Thus, it is not necessary that the differential transmission 4 or the gears 13, 14 and 21, 22 are constructed as bevel gear transmissions, but they may as well consist of spur gears.

What I claim is:

1. In a power transmitting arrangement for use in connection with a vehicle, particularly a rail vehicle having at least one first and one second axle adapted to be driven individually or in multiple, in at least two speeds in each direction of travel, in combination a non-reversible prime mover having a driving shaft, a fluid drive comprising an impeller drivingly connected with said driving shaft of said prime mover, and a turbine wheel, a mechanical gear transmission for positively conveying driving power from said fluid drive to both said axles simultaneously or to either one only of said axles, said gear transmission comprising an input shaft drivingly connected with said turbine wheel of said fluid drive, a first and a second output shaft; power distributing gear means interposed between said input shaft and said first and second output shaft; first gear means associated with said first output shaft and second gear means associated with said second output shaft; direction shifting means operable for selectively effecting driving connection between said first and second gear means and said first and second axle respectively for movement in one direction, and connection between said first and second gear means and said second and first axle respectively for travel in opposite direction; brake means associated with said first output shaft, and free wheel means interposed between said first output shaft and said first gear means associated therewith, said brake means serving in conjunction with said free wheel means for shifting speed by holding said first output shaft stationary, and transmitting power only from said second output shaft by way of said second gear means, dependent on the position of said direction shifting means, either to said first axle for travel in one direction or to said second axle for travel in the opposite direction.

2. An arrangement as described in claim 1 in which said power distributing gear is a planetary bevel gear transmission comprising a rotatable gear box and first and second bevel wheels.

3. An arrangement as described in claim 2 in which said rotatable gear box is positively connected with said input shaft, said first and second bevel wheels with said first and second output shafts respectively, and said gear means are adapted to effect such transmission ratios, that said first and second output shafts are rotating substantially in unison with each other when each of them is in driving connection with one of said axles.

4. In an arrangement as described in claim 2 in which said first bevel wheel is positively connected with said input shaft, said second bevel wheel with said first output shaft and said rotatable gear box with said second output shaft, and said gear means are adapted to effect such transmission ratios that said first output shaft is rotating in opposite direction and with twice the speed of said second output shaft when each of said output shafts is in driving connection with one of said axles; clutch means interposed between said first and second output shaft and operable to effect rotation of said shafts in unison with each other.

References Cited in the file of this patent

UNITED STATES PATENTS

| | | |
|---|---|---|
| 1,203,664 | Thomas | Nov. 7, 1916 |
| 1,447,488 | Schneider | Mar. 6, 1923 |
| 1,804,668 | Bolgiano | May 12, 1931 |
| 2,106,843 | Hahn | Feb. 1, 1938 |
| 2,114,179 | Fottinger | Apr. 12, 1938 |
| 2,145,005 | Fichtner | Jan. 24, 1939 |
| 2,145,006 | Fichtner | Jan. 24, 1939 |
| 2,146,569 | Fichtner | Feb. 7, 1939 |
| 2,213,349 | Seibold | Sept. 3, 1940 |
| 2,638,798 | Yingling | May 19, 1953 |

FOREIGN PATENTS

| | | |
|---|---|---|
| 58,690 | Denmark | May 19, 1941 |
| 152,165 | Austria | Jan. 10, 1938 |